United States Patent [19]

Reeves

[11] 4,051,390
[45] Sept. 27, 1977

[54] PARALLEL/TIME-SHARED VARIABLE TIME DELAY GENERATOR WITH COMMON TIMING CONTROL AND FAST RECOVERY

[75] Inventor: Charlie F. Reeves, Del Mar, Calif.

[73] Assignee: The United States of America as represented by the Secretary of the Navy, Washington, D.C.

[21] Appl. No.: 697,514

[22] Filed: June 18, 1976

[51] Int. Cl.² .................. H03K 5/13; H03K 5/159
[52] U.S. Cl. .................. 307/293; 307/265; 328/55; 328/58
[58] Field of Search .................. 328/55, 58, 207; 307/265, 293

[56] References Cited

U.S. PATENT DOCUMENTS

| 3,624,516 | 11/1971 | Rando et al. | 307/208 |
| 3,713,145 | 1/1973 | Butler et al. | 328/207 |
| 3,965,431 | 6/1976 | Johnson | 328/58 |

Primary Examiner—Stanley D. Miller, Jr.
Attorney, Agent, or Firm—R. S. Sciascia; G. J. Rubens; H. Fendelman

[57] ABSTRACT

A video-blanker system for supplying blanking pulses to receivers including a main delay one-shot for responding to a pretrigger pulse and establishing a time delay in response thereto by providing an output pulse of a predetermined width and an auxiliary delay one-shot having its input AND coupled to the pretrigger pulse and to the output of the main delay one-shot for responding to pretrigger pulses occurring during the timing cycle of the main delay one-shot. The outputs of the main and auxiliary delay one-shots are trailing edge discriminated and OR coupled to initiate a pulse width one-shot which supplies the required blanking pulse. The main and auxiliary delay one-shots include means for reducing the recovery times thereof, without affecting the quasistable periods.

7 Claims, 9 Drawing Figures

PRIOR ART

PRIOR ART

PARALLEL/TIME-SHARED VARIABLE TIME DELAY GENERATOR WITH COMMON TIMING CONTROL AND FAST RECOVERY

BACKGROUND OF THE INVENTION

The present invention relates generally to time gating devices and more specifically to those devices for supplying blanking pulses to receivers for the purpose of desensitizing them during the transmit time of certain friendly emitters. The present invention also relates to blanking systems utilizing monostable multivibrators or one-shots and to the recovery time aspects thereof.

A Navy blanking system, the AN/SLA-10A, is a time gating device which supplies blanking pulses to receivers for the purpose of desensitizing them during the transmit time of certain friendly emitters. In order to function properly, the AN/SLA-10A system must receive a trigger pulse that precedes the actual transmission by some known amount of time. Knowing this time, the width of the transmitted pulse and the measure of pulse stretching due to sea reflections, the required delay and width of the blanking pulse for that particular emitter can be determined. Each potentially interfering emitter feeds its pretrigger pulse into a separate channel of the AN/SLA-10A. The delay function is implemented by generating a pulse in a monostable multivibrator or one-shot and using the trailing edge of that pulse as a delay trigger for follow-on circuits. The required delay can, therefore, be set by adjusting the pulse width of the delay one-shot.

Relatively recent requirements have evolved for equipment to generate very high pulse-repetition-frequency (PRF) blanking pulses to minimize interference from certain high-PRF radars and some high data rate digital communication systems. Due to the relatively long recovery time of the delay one-shots of the AN/SLA-10A blanking system, it is not capable of handling these high-PRF signals.

At the trailing edge of its output pulse, a conventional one-shot will not have completely returned to its stable state. It requires additional time in which to allow transients in its timing circuit to decay to zero. This trailing edge transient period is referred to as recovery time. The fact that the one-shot must not be triggered during recovery time imposes a fundamental limitation upon the maximum PRF and duty cycle it can achieve. The recovery times associated with prior art one-shots, in particular the one-shots in the AN/SLA-10A have, from an operational standpoint, limited present equipment to a maximum blanking frequency far below that necessary to satisfy the previously mentioned requirements of high-PRF radars and high data rate digital communication systems.

SUMMARY OF THE INVENTION

The present invention relates to a variable time-delay generating network which has the capability of generating blanking pulses at significantly higher pulse repetition frequencies than those possible with other prior art circuits. This capability is achieved by a quick recharge electronic structure for substantially reducing the circuit recovery time of the blanking system delay one-shots. The capability is also enhanced by use of a parallel auxiliary delay one shot which is enabled only during the timing cycle of the main delay one-shot to effectively double the maximum PRF above the limit achieved by recovery time reduction and by dual constant-current sources controlled by a single potentiometer to insure that the delay pulse widths generated by the main and auxiliary delay one-shots are equal.

STATEMENT OF THE OBJECTS OF THE INVENTION

Accordingly, it is the primary object of the present invention to disclose a novel blanking system for providing blanking pulses at higher pulse repetition frequencies than previously attainable.

It is a further object of the present invention to disclose a variable time-delay generating network which can be operated at higher trigger rates than previously attainable.

It is a still further object of the present invention to disclose a novel blanking system which has the capability of responding to trigger pulses occurring during the time cycle of the main delay one-shot.

It is yet another object of the present invention to disclose a novel means of reducing the recovery time of a one-shot.

Other objects, advantages and novel features of the invention will become apparent from the following detailed description of the invention when considered in conjunction with the accompanying drawings.

Figure 1A:
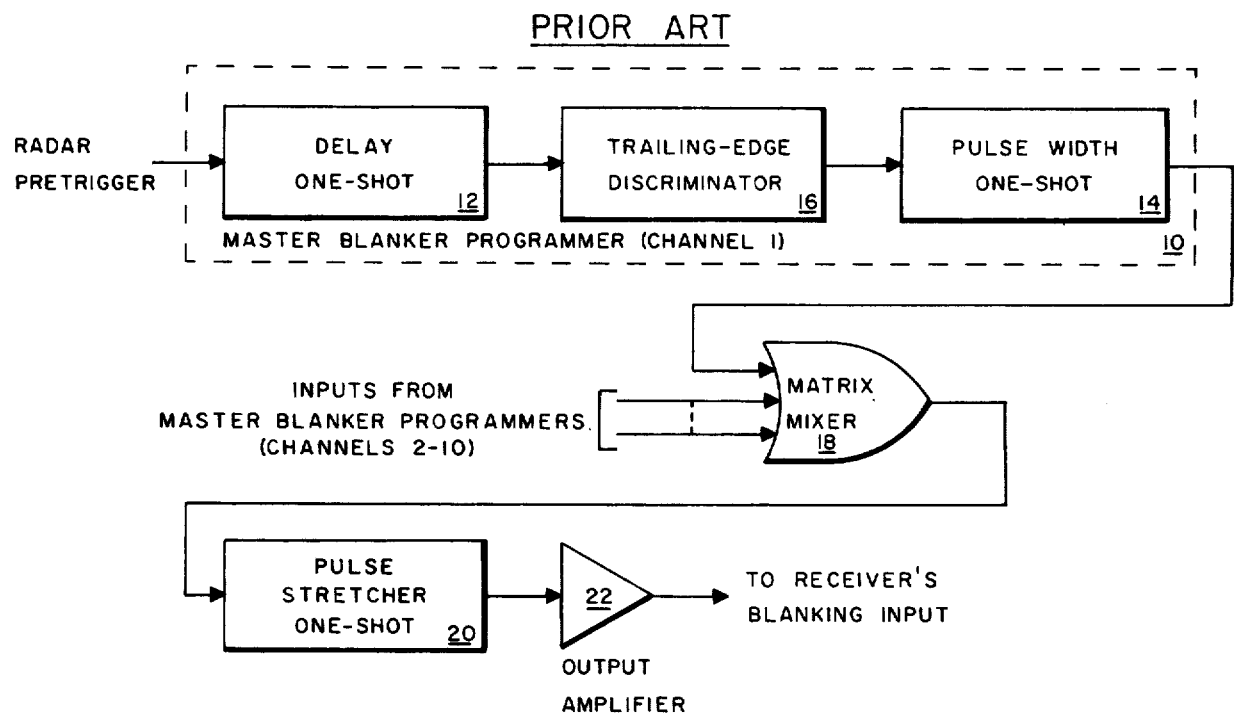
FIG. 1a is a schematic block diagram of a prior art blanking system.

FIG. b is a diagram of the waveform associated with the prior art system of FIG. 1a.

FIG. 2a is a network block diagram of the blanking system according to the present invention.

Figure 2B:
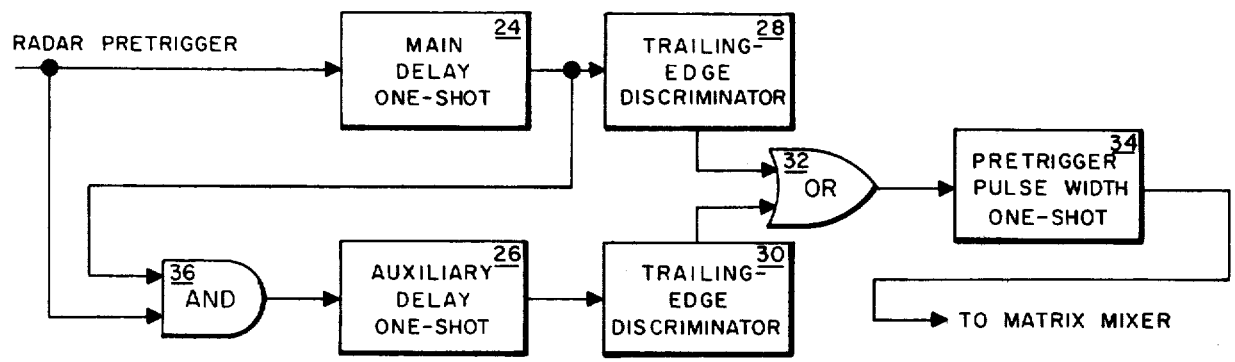
Figure 2B:
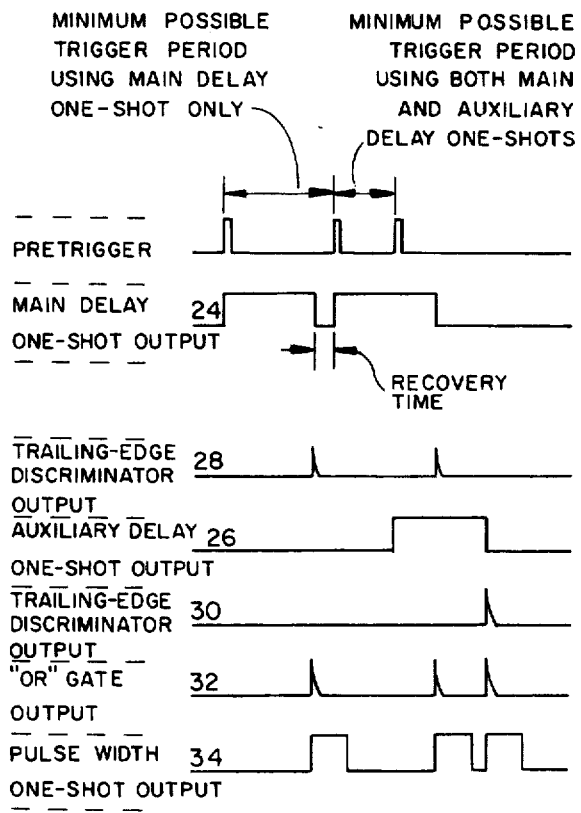

FIG. 2b is an illustration of the waveforms associated with the network of FIG. 2a for the case where the required delay is greater than the required blanking pulse period.

Figure 2C:
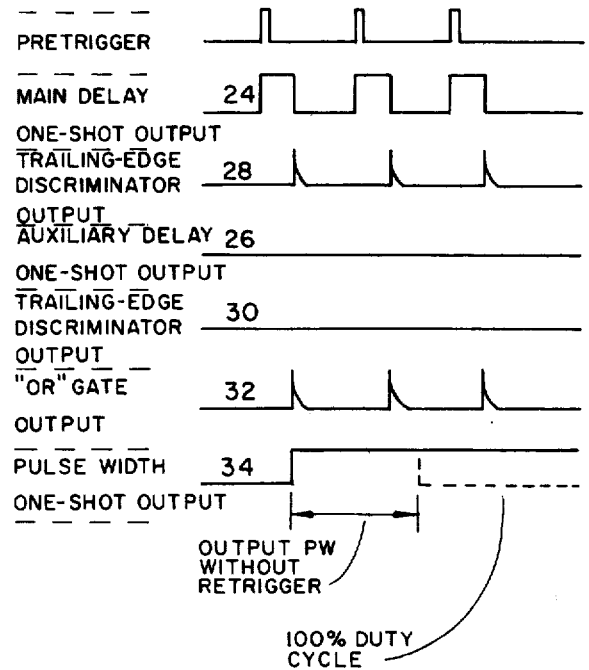

FIG. 2c is an illustration of the waveforms associated with the network of FIG. 2a for the case where the required delay is less than the required blanking pulse period.

Figure 3A:
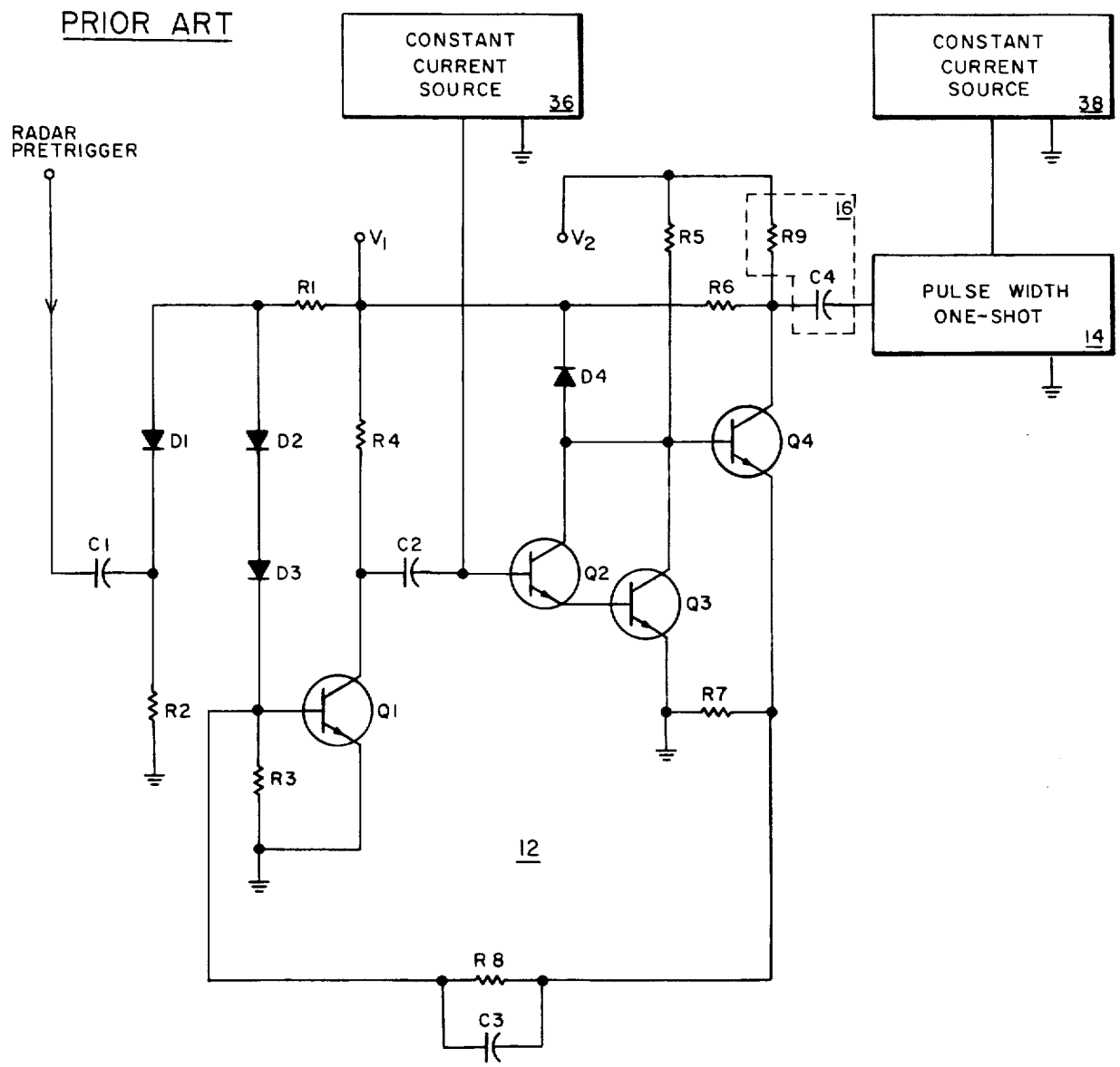

FIG. 3a is a circuit diagram of a prior art delay one-shot, trailing edge discriminator and pulse width one-shot suitable for use in the prior art system of FIG. 1a.

Figure 3B:
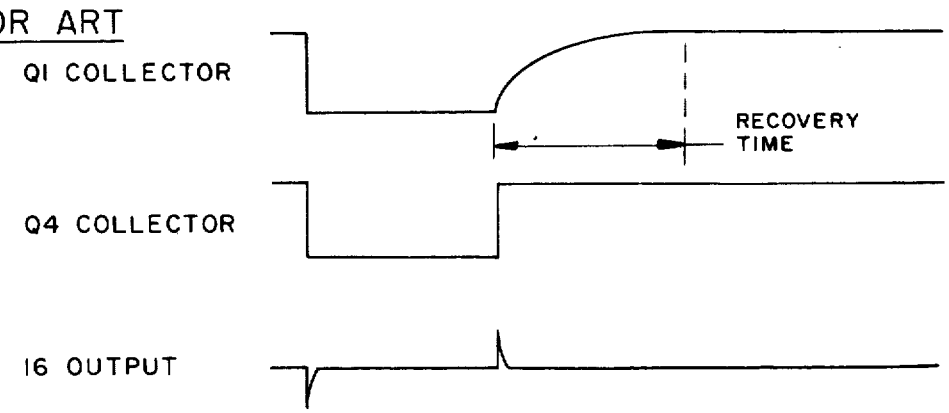

FIG. 3b is an illustration of the waveforms associated with the delay one-shot of FIG. 3a illustrating the recovery time thereof.

Figure 4A:
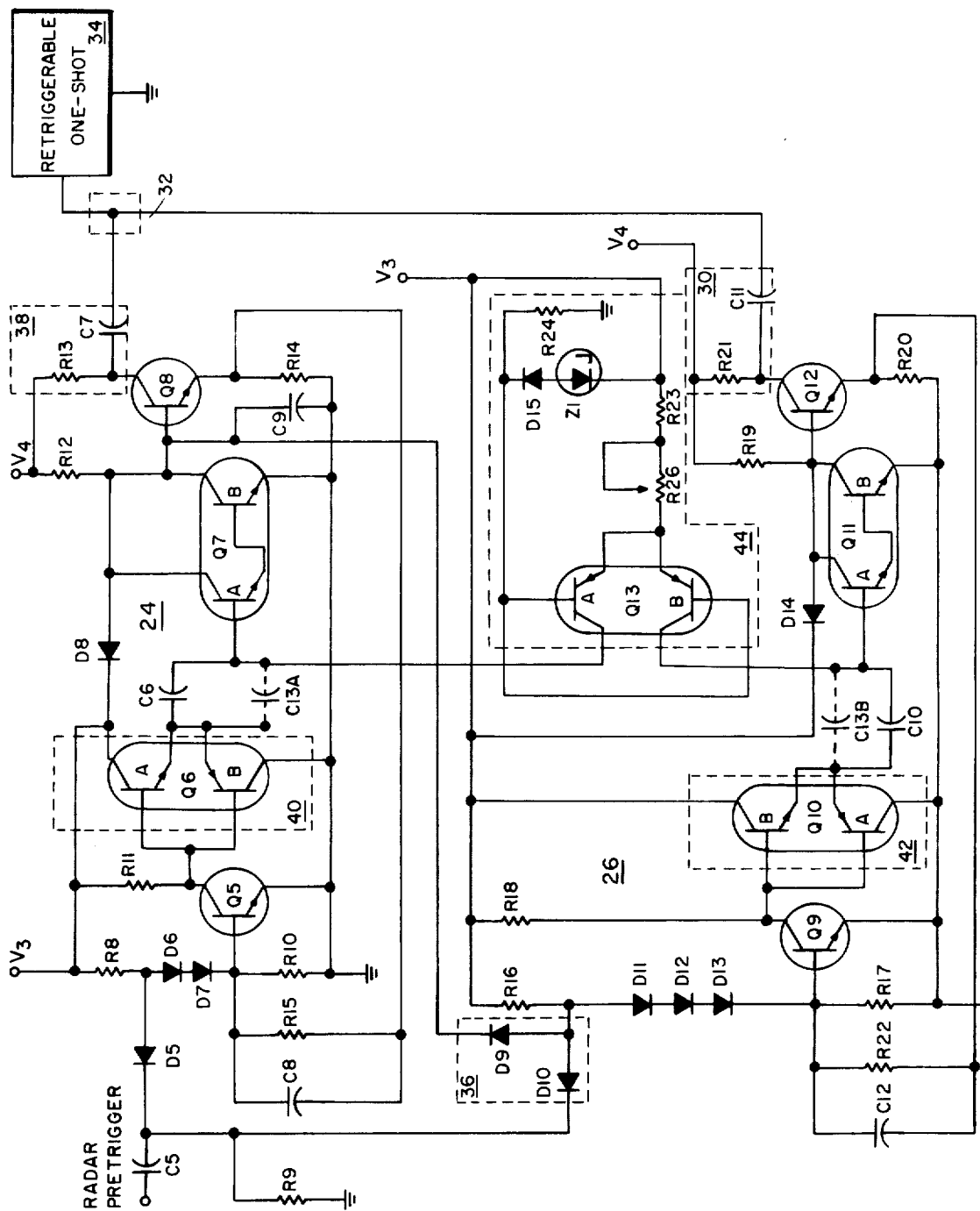

FIG. 4a is a network schematic diagram of the block diagram of FIG. 2a illustrating the means for reducing the recovery time of the one-shots and also illustrating the circuitry of the dual constant current source according to the present invention.

Figure 4B:
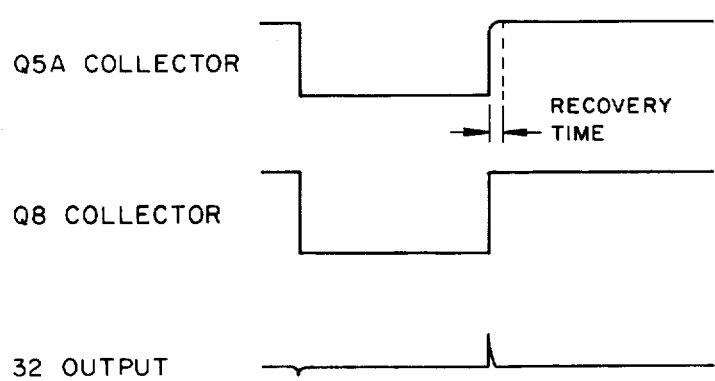

FIG. 4b is an illustration of the waveforms associated with the novel one-shots of FIG. 4a illustrating the reduced recovery time thereof.

DESCRIPTION OF THE PREFERRED EMBODIMENT

Figure 1B:
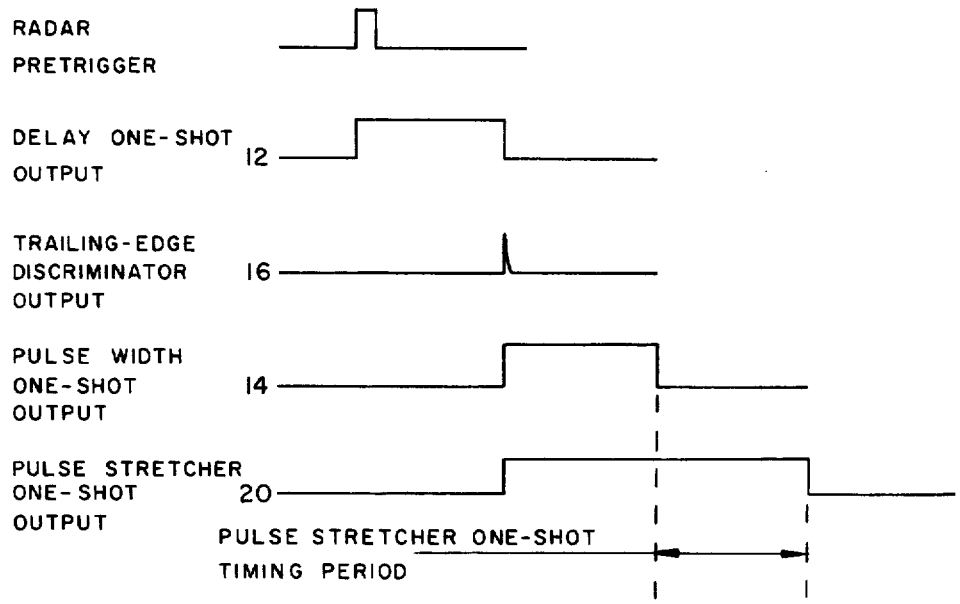

In order to facilitate an understanding of the present invention, a prior art blanking system related to the present invention will first be described with reference to FIGS. 1a and 1b. The prior art blanking system comprises a master blanker programmer 10 for each channel, i.e., for each transmitter. The master blanker programmer 10 consists of two one-shots by which the delay function and the pulse width function are implemented. The delay one-shot 12 is triggered by the leading edge of the radar pretrigger input. The pulse width one-shot 14 is triggered by the trailing edge of the delay one-shot 12 output pulse as determined by the trailing edge discriminator 16. Consequently, the blanking pulse generated by the pulse width one-shot 14 is delayed from the radar pretrigger by an amount of time equal to the width of the delay one-shot output pulse. Each potentially interfering emitter feeds its pretrigger pulse into a separate channel of the blanking system. The outputs of each master blanker programmer, 10 in the present example, are furnished as inputs to the matrix mixer OR gate 18 which is connected to a pulse stretcher one-shot 20 as illustrated. The pulse stretcher one-shot output is amplified at output amplifier 22, the output of which is fed to the appropriate receiver's blanking input. The pulse stretcher one-shot is used in those cases where the pulse width requirement exceeds the maximum pulse width of the pulse width one-shot 14. The pulse stretcher one-shot 20 is triggered by the leading edge of its input pulse does not begin its timing cycle until the trailing edge of its input pulse occurs. Thus, the width of the output pulse equals the width of the input pulse plus the pulse stretcher one-shot timing period (quasistable period). The waveforms related to the prior art network of FIG. 1a are illustrated in FIG. 1b.

Since delayed triggers are derived from the trailing edges of the delay one-shot pulses, the trailing edge of each pulse must be preserved. In other words, the delay one-shot circuit must not be retriggerable because to do so would result in the overlap of pulses when the pulse repetition period is less than the pulse width setting of the delay one-shot and, consequently, some trailing edges would be lost. The delay one-shot, therefore, will not respond to triggers that occur during a timing cycle from a previous trigger.

In accordance with the present invention, an auxiliary delay one-shot is added to the main delay one-shot to respond to trigger pulses that occur during the timing cycles of the main delay one-shot. Referring now to FIG. 2a there is illustrated in block diagram form the novel feature of incorporating an auxiliary delay one-shot into the master blanker programmer. As seen in FIG. 2a the blanker according to the present invention comprises a main delay one-shot 24 and an auxiliary delay one-shot 26. The outputs of the main delay one-shot and auxiliary delay one-shot are connected to trailing edge discriminators 28 and 30, respectively. The discriminators 28 and 30 provide inputs to OR gate 32, the output of which is supplied to the retriggerable pulse width one-shot 34. AND gate 36 has inputs connected to the radar pretrigger signal and to the output of the main delay one-shot and provides an output which is connected to the auxiliary delay one-shot 26. Since the output of the main delay one-shot 24 is used as a gate-enable signal to the AND gate 36, the AND gate 36 allows the pretrigger signal to trigger the auxiliary delay one-shot 26 only when the main delay one-shot 24 is in its timing cycle. The trailing edge of the output pulses from both one-shots 24 and 26, as detected by discriminators 28 and 30, are combined in the OR gate 32 such that either input from discriminator 28 or discriminator 30 will enable an output from OR gate 32. The output of the OR gate 32 triggers the retriggerable pulse width one-shot 34 which then generates delayed blanking pulses. AND gate 36, auxiliary delay one-shot 26, trailing edge discriminator 30 and OR gate 32 thus constitute an auxiliary delay means, the auxiliary delay one-shot 26 being activated only for cases in which the required delay is greater than the required blanking pulse period. In these case, the addition of the auxiliary delay one-shot 26 doubles the maximum possible blanking PRF above the limit achievable solely by reduction of the recovery time of the delay one-shot 24 to be described below. The waveforms associated with the network of FIG. 2a are illustrated in FIGS. 2b and 2c wherein FIG. 2b illustrates the case where the required delay is greater than the blanking pulse period and FIG. 2c illustrates the case where the required delay is less than the blanking pulse period. The reduction in the minimum possible trigger period achievable by using the auxiliary delay one-shot 26 is illustrated in FIG. 2b. By utilizing a retriggerable one-shot for the pulse width one-shot 34, a 100% duty cycle may be achieved as is illustrated in the waveform thereof of FIG. 2c for the case where the required output pulse width is greater than the required delay and where the period between pretrigger pulses is less than the output pulse width without retrigger.

Before describing the technique of the present invention utilized to reduce the recovery time of the one-shots, a prior art circuit implementation of the master blanker programmer 10 of FIG. 1a will be described in order to assist in the understanding of the novel features of the present invention. Referring now to FIG. 3a, it is initially noted that only the delay one-shot 12 of FIG. 1a is illustrated in detail since the pulse width one-shot 14 of FIG. 1a may comprise a substantially similar one-shot and may operate in substantially the same manner. At the input of the one-shot 12 and coupled to the radar pretrigger pulse through coupling capacitor C1 is a diode-resistor threshold circuit comprised of the resistor R1, diode D1 and resistor R2 connected in series between positive voltage supply $V_1$ and ground. The radar pretrigger input is connected at the juncture between diode D1 and resistor R2. The remaining portion of the threshold circuit comprises the series connection of diode D2, diode D3 and base-emitter resistor R3 connected as illustrated between the anode of diode D1 and ground. Input transistor Q1 has its collector connected to the juncture of timing resistor R4 and timing capacitor C2. THe emitter of input transistor Q1 is connected to ground and the base of input transistor Q1 is connected to the top of base-emitter resistor R3. The output transistor Q2 and Q3 are connected in a Darlington configuration with the base of transistor Q2 connected to timing capacitor C2 and the emitter of transistor Q3 being tied to ground. The collectors of transistors Q2 and Q3 are connected through collector resistor R5 to positive voltage supply $V_2$. Diode D4 is connected between the Q2–Q3 collectors and the positive voltage supply $V_1$. Inverter transistor Q4 has its base connected to the collectors of transistors Q2 and Q3 and has its collector connected to the right terminal of resistor R6. Resistor R7 is connected between the emitters of transistor Q3 and inverter transistor Q4. A feedback path is provided from the emitter of transistor Q4 to the base of transistor Q1 and comprises the resistor R8 and speed-up capacitor C3. Trailing edge discriminator 16 is comprised of resistor R9 and capacitor C4. The trailing edge discriminator 16 output is connected as illustrated to the pulse width one-shot 14. The one-shots 12 and 14 are connected to constant current sources 36 and 38, respectively, which include potentiometers for adjusting the outputs thereof, in order to selectively control the timing cycle of the one-shots.

The operation of the one-shot 12 is as follows. In the stable state with no pretrigger input pulse occurring, a conduction path exists from the positive voltage supply $V_1$ through the resistor R1, through the diode D1 and the resistor R2 to ground. The voltage at the anode of diode D2 is, however, insufficient to create a current path through the diodes D2, D3 and the base-emitter resistor R3. Thus, the input transistor Q1 is non-conducting. The timing capacitor C2 is charged from the positive voltage supply $V_1$ through the timing resistor R4 through the capacitor C2 and through the base-emitter junctions of the output transistors Q2 and Q3 to ground. The output transistors Q2 and Q3 receive base drive from the constant current source 36 to keep them in the fully saturated condition. Capacitor C2 having been fully charged is in an open circuit condition. The collectors of transistors Q2 and Q3 are at essentially ground potential and, therefore, the base of inverter transistor Q4 is also at approximately ground potential, holding transistor Q4 non-conducting. When a positive pretrigger input pulse is supplied to the cathode of diode D1, diode D1 becomes back-biased raising the potential at the anode of diode D2 to a level sufficient to cause conduction therethrough and consequently through diode D3 and base-emitter resistor R3. This conduction path is sufficient to raise the base-emitter voltage of the input transistor Q1 to cause it to turn on. Conduction of transistor Q1 then provides a discharge path for the timing capacitor C2 through the transistor Q1 to ground. The decreasing voltage at the collector of the transistor Q1 is coupled through the capacitor C2 to the base of transistor Q2 and, likewise, transistor Q3 causing the transistors Q2 and Q3 to turn off. The one-shot is now in the quasistable state and will remain there until the transistors Q2 and Q3 are turned back on again. Upon non-conduction of the transistors Q2 and Q3, the collectors thereof rise to the voltage at the anode of diode clamp D4. Since the base electrode of transistor Q4 is tied to the anode of diode D4 and the collectors of transistors Q2 and Q3, the rise in voltage at the anode of diode D4 turns on the inverter transistor Q4 which is connected as an emitter follower so far as this potential is concerned. The potential at the emitter of transistor Q4 is then fed back to the base of transistor Q1 through the feedback path consisting of resistor R8 and speed-up capacitor C3. This is a regenerative feedback that keeps transistor Q1 on as long as the capacitor C2 discharge path exists to keep the transistors Q2 and Q3 off. When capacitor C2 has been fully charged by the constant current source 36 through the transistor Q1 and again becomes an open circuit, the potential at the base of transistors Q2 and Q3 then rises again to return the transistors Q2 and Q3 to conduction being fed by the current from the constant current source 36. Conduction of transistors Q2 and Q3 returns their collectors back to approximately ground potential, turning off the inverter transistor Q4 and taking away the feedback drive that kept the input transistor Q1 turned on. Input transistor Q1, therefore, turns off again since the pretrigger pulse is no longer present and the potential at the anode of diode D2 is no longer sufficient to maintain the conduction path therethrough to the base-emitter resistor R3. The timing cycle or quasistable period of the one-shot is now complete. It is noted, however, that the capacitor C2 at this stage has been charged from the constant current source 36 such that the terminal of capacitor C2 connected to the base of transistor Q2 is positive and the terminal of capacitor C2 connected to the collector of transistor Q1 is negative. In order for the one-shot to return to its stable state, the capacitor C2 must discharge through the base-emitter junctions of the now conducting transistors Q2 and Q3 to ground and recharge in the opposite direction from the positive voltage supply $V_1$ through the timing resistor R4. The time necessary for the capacitor to discharge and recharge in this fashion is known as the recovery time and is illustrated in the waveform diagrams of FIG. 3b.

Referring now to FIG. 4a wherein the details of the circuitry of FIG. 2a are illustrated, the technique of reducing the recovery time of the one-shots in accordance with the present invention will now be described. The main delay one-shot 24 receives the radar pretrigger signal through the coupling capacitor C5. The positive voltage supply $V_3$ is connected to the diode-resistance voltage divider network comprised of the series connection of resistor R8, diode D5 and resistor R9 which is connected to ground. The other leg of the voltage divider network is comprised of diodes D6, D7 and base-emitter resistor R10 connected to ground. Input transistor Q5 has its collector connected to the timing resistor R11, its emitter connected to ground and its base connected to the cathode of diode D7, as illustrated. The recovery time reducing means 40 is comprised of dual NPN/PNP transistors Q6A and Q6B which have their bases tied together and connected to the bottom of the timing resistor R11 and have their emitters tied together and coupled to the timing capacitor C6 as illustrated. The collector of transistor Q6A is connected to the positive voltage supply $V_3$ and the collector of the transistor Q6B is connected to ground. The other terminal of the timing capacitor C6 is connected to the output Darlington transistor pair Q7A and Q7B at the base of transistor Q7A. The collectors of the Q7 transistor pair are connected through collector resistor R12 to the positive voltage supply $V_4$. Diode D8 is provided as a voltage clamp to prevent the collector voltages from rising above a predetermined voltage, e.g., 8 volts. Inverter transistor Q8 has its base connected to the collectors of the transistor pair Q7 and its collector connected to the trailing edge discriminator 28 comprised of the resistor R13 and capacitor C7. Emitter resistor R14 is connected in shunt with the feedback resistor R15 and the speed-up capacitor C8.

AND gate 36 comprised of diodes D9 and D10 is connected to the radar pretrigger input at the cathode of diode D10 and is connected to the one-shot 24 at the collectors of the transistor pair Q7.

The auxiliary delay one-shot 26 is connected substantially the same as one-shot 24 and is comprised of the input diode-resistance structure including resistor R16, diodes D11, D12 and D13 and base-emitter resistor R17. Input transistor Q9 has its base connected to the cathode of diode D13 and its collector connected through collector resistor R18 to the positive voltage supply $V_3$. The emitter of input transistor Q9 is connected to ground as illustrated. Recovery time reducing means 42 has one terminal connected to the timing resistor R18 and the other terminal connected to the timing capacitor C10 and is comprised of the dual NPN/PNP transistor pair Q10A and Q10B. The other terminal of the timing capacitor C10 is connected to the output Darlington transistor pair Q11A and Q11B. The transistor pair Q11 has its collectors connected through collector resistor R19 to the positive voltage supply $V_4$ as well as to the base of the output inverting transistor Q12. The emitter of transistor Q11B is connected to ground as illustrated and the emitter of inverter transistor Q12 is connected through emitter resistor R20 to ground. The collector of the inverter transistor Q12 is connected to the trailing edge discriminator 30 comprised of resistor R21 and capacitor C11. The emitter of transistor Q12 is also connected in the feedback path comprised of feedback resistor R22 and speed-up capacitor C12 which are in turn connected to the base of input transistor Q9. Diode clamp D14 is provided between the collectors of transistors Q10 and Q11 as illustrated and functions in the same manner as the diode clamp D8 described above.

The outputs of the trailing edge discriminators 28 and 30 are wire OR'd at 32, the output of which is inputted to the retriggerable one-shot 34.

The addition of the auxiliary delay one-shot 26 requires the provision of a timing control which is common to both one-shots 24 and 26. This is required to insure that when the auxiliary delay one-shot 26 is triggered it produces a pulse identical in width to that of the main delay one-shot 24 so that all output blanking pulses will be delayed by the same amount of time with respect to the pretrigger signals. The common timing control is provided by the dual constant-current source 44 comprised of transistors Q13A and Q13B having their collectors connected to the timing capacitors C6 and C10 as illustrated. A single variable resistor R26 controls the amount of current. The bases of transistors Q13 are externally tied together and driven by current supplied through the zener diode Z1 as well as resistor R23, resistor R24 and diode D15. The emitter-base currents of transistors Q13 and consequently the collector currents thereof are controlled by the resistor R26 located in the emitter circuits. Since the base-emitter voltages of the dual transistors Q13 are closely matched and the current gains track over the entire operating temperature range, the collector currents of transistors Q13A and Q13B will be substantially identical for any given setting of the variable resistor R26. Therefore, the main and auxiliary delay one-shots 24 and 26, respectively, will generate pulses of equal width as determined by the currents of the two identical constant-current sources which in turn are set by the single component R26. In order to insure that the timing capacitances of each of the one-shots 24 and 26 are precisely the same, capacitances C13A and C13B may be incorporated therein for matching purposes.

The operation of the one-shots 24 and 26 will now be described. Since the operation of these one-shots is similar to the one-shot illustrated in FIG. 3a and described above, attention will be directed primarily to the novel features thereof. In FIG. 4a transistor Q5, capacitor C6 and resistor R11 of one-shot 24 and transistor Q9, capacitor C10 and resistor R18 are analogous to the transistor Q1, capacitor C2 and resistor R4, respectively, of the one-shot 12 illustrated in FIG. 3a. Likewise, output transistors Q8 and Q12 of one-shots 24 and 26, respectively, are analogous to output transistor Q4 of one-shot 12.

In the stable state of one-shot 24, transistors Q5 and Q6 are non-conducting and transistors Q7A and Q7B are conducting, receiving base drive from the constant current source 44. When an input pretrigger pulse is received, diode D5 is back-biased such that the voltage at the anode of diode D6 rises sufficiently high to create a current path through the base-emitter resistor R10 to ground from the positive voltage supply $V_3$. This triggers input transistor Q5 into conduction such that the voltage at its collector falls to near ground potential. The near zero potential at the collector of transistor Q5 to which the base of transistor Q6B is connected foeward biases the base-emitter junction of transistor Q6B to cause the transistor Q6B to turn on grounding one side of the timing capacitor C6 and initiating the timing cycle. The near zero voltage at the collector of transistor Q5 is coupled through the timing capacitor C6 to the bases of the transistor pair Q7 to cause them to turn off. The voltage at the collectors of the transistor pair Q7 thus rises, initiating conduction of the output transistor Q8 and initiating the output pulse. The regenerative feedback loop, including the speed-up capacitor C8 and resistor R15 maintains conduction of the input transistor Q5 while transistor Q8 is conducting. As the capacitor C6 is recharged in the opposite direction from the constant current source 44 through the base-emitter junction of transistor Q6B and the input transistor Q5 and again becomes an open circuit, the voltage at the bases of the transistor pair Q7 again rises such that transistor Q7A and transistor Q7B again turn on returning their collector potentials to near zero and causing transistor Q8 to cease conducting, thus removing the regenerative feedback base drive for the input transistor Q5. The circuit has now completed the quasistable period and is now ready to begin return to the stable state, the quasistable period having been unaffected by the recovery time reducing means 40. When transistor Q5 ceases conduction, transistor Q6B also turns off since the potential at its base rises to back-bias its base-emitter junction. The rise in potential at the base of the transistor pair Q6, however, now momentarily forward biases the base-emitter junction of the transistor Q6A initiating conduction thereof. Conduction of Q6B permits capacitor C6 to discharge the charge it has built up from the constant current source 44 through the base-emitter junctions of Q7A and Q7B and also permits recharging of C6 from the voltage supply $V_3$ through the timing resistor R11 and the base-emitter path pf Q6A. The time it takes C6 to discharge and recharge in this manner is the one-shot 24 recovery time. Conduction of transistor Q6A causes the timing capacitor C6 to see the timing resistor R11 through the emitter of the transistor Q6A and consequently the resistance of the timing resistor R11 is effectively divided by the current gain ($\beta$) of the transistor Q6A. As a result, the R11-C6 time constant and hence the trailing edge transient period or recovery time is reduced by a multiplicative factor of $1/\beta$. It should thus be apparent that judicious selection of the current gain for the transistor Q6A can lead to extremely desirable reductions in recovery times. Exemplary waveforms of the operation of FIG. 4a are illustrated in FIG. 4a are illustrated in FIG. 4b.

The operation of the one-shot 26 is identical to that of the one-shot 24 and thus will not be described. One-shot 26 is initiated into conduction by an output from the AND gate 36. When no pretrigger pulse has been received, the transistors Q7 are conducting, forward biasing the diode D9 to clamp the potential at the anode thereof to near ground potential. Similarly, in the absence of a pretrigger pulse the diode D10 is forward biased thus maintaining its anode also at near ground potential. The occurrence of a pretrigger pulse backbiases the diode D10 but the anode potential thereof will not rise towards the positive voltage supply $V_3$ potential until the diode D9 is also back-biased by a rise in the collector voltages of the transistor pair Q7 upon their non-conduction. Thus, only simultaneous back-biasing of the diodes D10 and D9 causes an "output" from the AND gate 36. The output or rise in potential at the anodes of D10 and D9 establishes the current path through the diodes D11, D12 and D13 and the base-emitter resistor R17 to initiate operation of the one-shot 26.

It may thus be appreciated that a novel system has been disclosed for increasing the PRF of a blanking system by providing an auxiliary delay one-shot for responding to trigger pulses occurring during the timing cycle of the main delay one-shot and by reducing the recovery times of each of the one-shots in the blanking system. The retriggerable one-shot 34 may also incorporate the recovery time reducing means disclosed and described with respect to the one-shots 24 and 26, if desirable.

Obviously many modifications and variations of the present invention are possible in the light of the above teachings. It is therefore to be understood that within the scope of the appended claims the invention may be practiced otherwise than as specifically described.

What is claimed is:

1. A system for providing output pulses of a predetermined width after a predetermined delay from the receipt of a pretrigger pulse including a non-retriggerable, main delay one-shot for receiving said pretrigger pulse and having a predetermined timing cycle for providing said predetermined delay, and further comprising:
    a first trailing edge discriminator connected to the output of said main delay one-shot;
    auxiliary delay means operably coupled to said main delay one-shot for responding to pretrigger pulses occurring during said main delay one-shot timing cycle when said predetermined delay is greater than said predetermined width;
    and a retriggerable pulse width one-shot connected to the output of said auxiliary delay means and operably coupled to the output of said first trailing edge discriminator for providing said output pulses of a predetermined width.

2. The system of claim 1 in which said auxiliary delay means comprises:
    an AND gate having a first input connected to the input of said main delay one-shot and a second input connected to the output of said main delay one-shot;
    an auxiliary delay one-shot connected to the output of said AND gate;
    a trailing edge discriminator connected to the output of said auxiliary delay one-shot; and
    an OR gate having a first input connected to the output of said first trailing edge discriminator, a second input connected to the output of said second trailing edge discriminator and having its output connected to said retriggerable pulse width one-shot.

3. The system of claim 2 including a dual constant current source connected to both said main delay one-shot and said auxiliary delay one-shot.

4. The system of claim 3 wherein said dual constant current source includes control means for simultaneously controlling the pulse widths of the pulses generated by both said main delay and auxiliary delay one-shots.

5. The system of claim 3 wherein said main delay one-shot and said auxiliary delay one-shot include a main delay R-C timing circuit and an auxiliary delay R-C timing circuit respectively;
    said main delay R-C timing circuit including a first resistor, first means for reducing the recovery time of said main delay one-shot without affecting the quasistable period thereof, said first means having a first terminal connected to said first resistor, said main delay R-C timing circuit further including a first capacitor connected to a second terminal of said first means; and
    said auxiliary delay R-C timing circuit including a second resistor, second means for reducing the recovery time of said auxiliary delay one-shot without affecting the quasistable period thereof, said second means having a first terminal connected to said second resistor, said auxiliary delay R-C timing circuit further including a second capacitor connected to a second terminal of said second means.

6. The system of claim 5 wherein said first means comprises first and second transistors each having a base connected to said first resistor and an emitter connected to said first capacitor; and
    said second means comprises third and fourth transistors each having a base connected to said second resistor and an emitter connected to said second capacitor.

7. The system of claim 6 wherein said first and third transistors are NPN transistors and said second and fourth transistors are PNP transistors.

* * * * *